US012647526B2

(12) United States Patent
Huang et al.

(10) Patent No.: US 12,647,526 B2
(45) Date of Patent: Jun. 2, 2026

(54) IMAGE CORRECTION METHOD

(71) Applicant: BENQ CORPORATION, Taipei City (TW)

(72) Inventors: Yi-Han Huang, Taipei (TW); Yi-Ho Bai, Taoyuan City (TW)

(73) Assignee: BENQ CORPORATION, Taipei City (TW)

( * ) Notice: Subject to any disclaimer, the term of this patent is extended or adjusted under 35 U.S.C. 154(b) by 34 days.

(21) Appl. No.: 19/011,647

(22) Filed: Jan. 7, 2025

(65) Prior Publication Data

US 2025/0324166 A1 Oct. 16, 2025

(30) Foreign Application Priority Data

Apr. 15, 2024 (TW) ................................. 113113994

(51) Int. Cl.
| | |
|---|---|
| *H04N 1/60* | (2006.01) |
| *G06T 7/80* | (2017.01) |
| *H04N 9/64* | (2023.01) |
| *H04N 23/85* | (2023.01) |
| *H04N 23/86* | (2023.01) |

(52) U.S. Cl.
CPC ............. *H04N 1/6033* (2013.01); *G06T 7/80* (2017.01); *H04N 9/643* (2013.01); *H04N 23/85* (2023.01); *H04N 23/86* (2023.01)

(58) Field of Classification Search
CPC ...... H04N 1/6033; H04N 9/643; H04N 23/85; H04N 23/86; G06T 7/80
See application file for complete search history.

(56) References Cited

U.S. PATENT DOCUMENTS

| | | | | |
|---|---|---|---|---|
| 2007/0133017 | A1* | 6/2007 | Kobayashi | .............. H04N 1/56 358/1.9 |
| 2019/0371004 | A1* | 12/2019 | Lin | ........................ G03B 17/18 |

FOREIGN PATENT DOCUMENTS

| | | |
|---|---|---|
| TW | 201208363 A | 2/2012 |
| TW | 202004673 A | 1/2020 |

\* cited by examiner

*Primary Examiner* — Nicholas G Giles
(74) *Attorney, Agent, or Firm* — Winston Hsu

(57) ABSTRACT

An image correction method includes the following steps: (1) obtaining a color card including color blocks, where each of the color blocks has a predefined color standard; (2) placing an image capturing device and the color card in a selected operating environment; (3) using a system of the image capturing device to capture RGB values of each of the color blocks on the color card and converting the RGB values into HSV values; (4) comparing the predefined color standard of each of the color blocks with the HSV values of each of the color blocks to determine a degree of difference in H value, S value and V value between the predefined color standards and the HSV values; and (5) automatically adjusting the HSV values according to the predefined color standards and the degree of difference of each of the color blocks.

20 Claims, 5 Drawing Sheets

| 5500K | Before correction | Target | After correction |
|---|---|---|---|
| Image | | | |
| dH | 10.77 | 0 | 5.17 |
| dS | 7.31 | 0 | 2.63 |
| dV | 19.48 | 0 | 3.64 |
| dE2000 | 14.81 | 0 | 4.00 |

FIG. 4

IMAGE CORRECTION METHOD

BACKGROUND OF THE INVENTION

1. Field of the Invention

The present disclosure relates to an image correction method, particularly a method for performing image correction using a color card.

2. Description of the Prior Art

With the rapid increase in the demand for remote work and teaching, the development of online meeting and real-time sharing technologies has been promoted. However, this communication method has a significant problem: the color distortion problem commonly seen in video conferences. Color distortion mainly arises from the imaging quality of video cameras and the limitations of display devices, such as in home office environments with multiple or complex light sources.

General color correction techniques utilize the built-in automatic white balance function of cameras, which detects the color temperature of the current environment by analyzing the image and applies predefined white balance parameters to adjust color performance. However, this method has two obvious drawbacks. The first drawback is that predefined white balance parameters may fail to provide optimal adjustments due to misjudgment in color temperature detection. The second drawback is that since the white balance function adjusts the color of the entire image, it can easily create color filter effect, leading to changes in the overall hue of the image.

To solve the above-mentioned color distortion problem, color card-based color correction can also be used. However, the commercially available color cards are developed for professional camera manufacturers, and general end-users cannot perform camera calibration by themselves using these color cards. Moreover, the optimal display effect may still not be achieved under multiple light sources. Furthermore, when photographing people, the accuracy of skin tones under different light sources still has room for improvement, even with the use of commercially available color cards are used.

In light of the above problems, it is necessary to provide an image correction method that allows end-users to use color cards by themselves to solve the technical problems existing in the prior art, such as color distortion, without using the automatic white balance function of the camera.

SUMMARY OF THE INVENTION

To solve the above technical problems, the present disclosure provides a new image correction method aimed at reducing the distortion effects of environmental light sources on images to better restore the true colors of objects under multiple or complex light source conditions.

According to an embodiment of the present disclosure, an image correction method is provided, which includes the following steps: (1) obtaining a color card including color blocks, where each of the color blocks has a predefined color standard; (2) placing an image capturing device and the color card in a selected operating environment; (3) using a system of the image capturing device to capture RGB values of each of the color blocks on the color card and converting the RGB values into an HSV value; (4) comparing the predefined color standard of each of the color blocks with the HSV values of each of the color blocks to determine a degree of difference in H value, S value and V value between the predefined color standards and the HSV value; and (5) automatically adjusting the HSV value according to the predefined color standards and the degree of difference of each of the color blocks.

The present disclosure utilizes a color card including multiple color blocks. An image capturing device and the color card are placed in a selected operating environment to determine the degree of difference between the predefined color standard of each of the color blocks and the HSV values obtained from the system of the image capturing device. Based on the predefined color standards and the degree of difference of each of the color blocks, the HSV values set by the image capturing device can be automatically adjusted, and thus the images captured by the image capturing device can be adjusted. Therefore, this adjustment allows the captured images to be closer to what is observed by the naked eye. This correction method can effectively reduce the distortion effects of images caused by the environmental light sources, thereby better restoring the true colors of objects under multiple or complex light source conditions.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

To facilitate understanding of the following text, reference can be made to the figures and their detailed descriptions while reading the present disclosure. Through the specific embodiments in this text and reference to the corresponding figures, the specific embodiments of the present disclosure can be explained in detail, and the principles of operation of the specific embodiments of the present disclosure can be elucidated. Additionally, for clarity, the features in the figures may not be drawn to scale, so some features in certain figures may be intentionally enlarged or reduced in size.

FIG. 4 is a table of experimental data after image correction according to one embodiment of the present disclosure.

DETAILED DESCRIPTION

Figure 1:
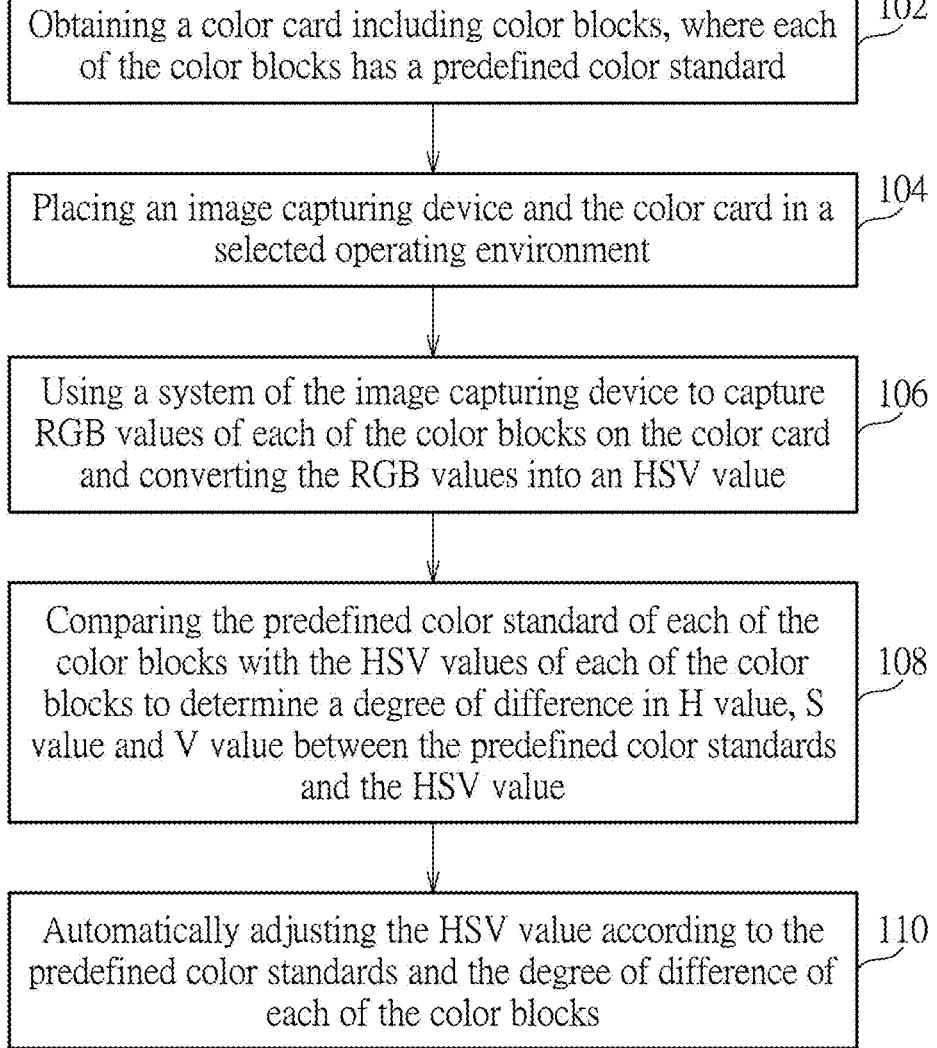
FIG. 1 is a flowchart of the image correction method according to one embodiment of the present disclosure.

The following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The specific order or hierarchy of blocks in the processes/flowcharts disclosed is an illustration of exemplary approaches. Based upon design preferences, the specific order or hierarchy of blocks in the processes/flowcharts may be rearranged. Further, some blocks may be combined or omitted.

Although the disclosure is described with respect to specific embodiments, the principles of the disclosure, as defined by the claims appended herein, may obviously be applied beyond the specifically described embodiments of the disclosure described herein. Moreover, in the description of the present disclosure, certain details have been left out in order to not obscure the inventive aspects of the disclosure. The details left out are within the knowledge of a person having ordinary skill in the art.

FIG. 1 is a flowchart of the image correction method according to one embodiment of the present disclosure. According to the flowchart shown in FIG. 1, an image correction method is provided, particularly a method for correcting a single image or a continuous image captured by a network camera (also known as a webcam), which includes at least the following steps: (1) step 102, obtaining a color card that includes multiple color blocks, each of the color blocks having a predefined color standard; (2) step 104, placing the image capturing device and color card in a selected operating environment; (3) step 106, using a system of the image capturing device to capture RGB values of each of the color blocks on the color card and converting the RGB values into HSV values (hue, saturation, lightness); (4) step 108, comparing the predefined color standards of each of the color blocks with the HSV values of each of the color blocks to determine the degree of difference in H value (hue), S value (saturation), and V value (lightness) between the predefined color standards and the HSV values; and (5) step 110, automatically adjusting the HSV values set by the image capturing device according to the predefined color standards and the degrees of difference of each of the color blocks. The following further elaborates on steps (1) to (5).

According to one embodiment, the image correction method of the present disclosure can be used to correct images generated in remote video teaching or video conferencing, so the source of the images is primarily indoor scenes (e.g., classrooms or offices), rather than outdoor scenes (e.g., street views or natural landscapes). Compared to outdoor scenes, indoor scenes typically have colors that more frequently appear in black, white, and gray tones, with less occurrence of sky blue or earth green. Additionally, these images often include human figures (such as faces), which contain skin colors.

For step 102, obtaining a color card including multiple color blocks, where each of the color blocks has a predefined color standard. According to one embodiment, the color card is for example the color card 200 used for image correction. Here, the substantive meaning of the color card 200 is equivalent to a color checker. The color card 200 can be composed of a series of standardized color blocks 211-264, which represent colors commonly seen under natural or artificial light sources. Each of the color blocks on the color card 200 usually contains colors of different lightness and saturation, ranging from black, white, and gray to various colors (e.g., red, blue, green, etc.). Using the color card 200 for color balancing may help ensure consistency and accuracy of colors in images captured from the camera under varying environmental light sources.

According to one embodiment, the color blocks 211-264 include a first group 202 for adjusting hue and saturation of the image. For example, the first group 202 consists of 12 color blocks 221-224, 231, 234, 241, 244, 251-254 located within a closed annular region, where the major six primary color blocks are selected from the six-axis primary colors of the sRGB (standard Red Green Blue) color space; the remaining six color blocks are positioned at the midpoints of the xy-coordinates between adjacent primary colors in the sRGB color space, allowing the color blocks to cover a large portion of the color axes in the color space, and achieving better results for hue correction of the image.

According to other embodiments, each of the color blocks in the first group 202 has saturation (S value) of 45-70% and lightness (V value, also known as brightness B) of 50-100%. Because the color saturation of each of the color blocks in the first group 202 is between 45-70%, when subsequently performing the image correction, it can avoid the original image acquired through the camera being oversaturated, which would then affect the parameter adjustment, and prevent distortion of the adjusted image colors.

According to one embodiment, the color blocks 211-264 include a second group 204 for adjusting the colors in portrait modes. For instance, when the image captured by the image capturing device contains human figures and the figures include exposed skin, the color blocks in the second group 204 can be used to adjust the hue and saturation of the human image. The second group 204 at least includes a first region 204A and a second region 204B which are located at the two opposite edges of the color card 200. The second group includes the first skin color block, the second skin color block, the third skin color block, and an orange color block, which corresponds to color blocks 212, 213, 262, and 263, respectively. If using the CIE Lab color space as the evaluation standard, the first, the second, and the third skin colors correspond to the skin colors of different ethnic groups, such as Japanese skin color, Caucasian skin color, and African skin color. Those skin colors have different Lab values, where L value represents lightness, a value represents green/red value, and b value represents blue/yellow value. For example, the first skin color for Japanese skin has an L value of 50-70, an a value of 7-12, and a b value of 10-26; the second skin color for Caucasian has an L value of 50-70, an a value of 6-11, and a b value of 7-19; and the third skin color for African has an L value of 40-60, an a value of 7-16, and a b value of 9-38. The values for the first, the second, and the third skin colors are summarized in Table 1. As the color card 200 includes the color blocks of three different skin colors, it is applicable to images of people with various skin colors, and achieves better correction results.

TABLE 1

| Skin Color | L | a | b |
|---|---|---|---|
| Japanese | 50~70 | 7~12 | 10~26 |
| Caucasian | 50~70 | 6~11 | 7~19 |
| African | 40~60 | 7~16 | 9~38 |

According to one embodiment, the color blocks 211-264 include a third group 206 for adjusting the grayscale of images. The third group 206 includes a first region 206A and a second region 206B. The first region 206A is located in the center of color card 200 and includes color blocks 232, 233, 242, and 243, while the second region 206B is located at the four corners of color card 200 and includes color blocks 211, 214, 261, and 264. The grayscale values of the color blocks in the third group 206 range from 32 to 235, including colors such as black, white, and gray. The colors of the color blocks in third group 206 differ from those in the first group 202 and second group 204. Since the color blocks of the third group 206 are positioned at the center and corners of the color card 200 rather than positioned in a closed annular region, the adverse effects caused by center-weighted metering or spot-weighted metering during subsequent image correction can be better avoided.

Figure 2:
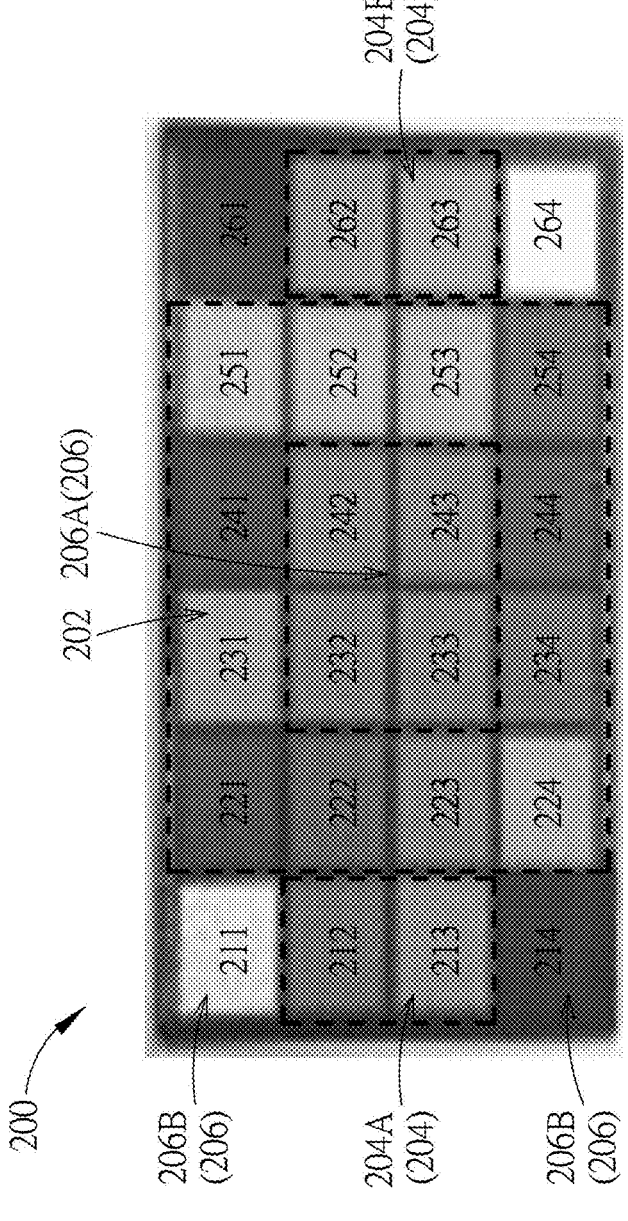
FIG. 2 is a color card used for image correction according to one embodiment of the present disclosure.

In (1) step 102, referring to FIG. 2, each of the color blocks has a predefined color standard. The predefined color standard may be the RGB values of each of the color blocks on the color card 200 as displayed under a standard light source (such as D50 or D65 light source), or THE RGB values that are adjusted based on manual settings. The predefined color standard may not be limited to the RGB values but can also be the HSV value or the Lab value, depending on the requirements.

Next, referring to both FIG. 1 and FIG. 2, performing (2) step 104, placing the image capturing device and the color card 200 in a selected operating environment. According to an embodiment of the present disclosure, the image capturing device, for example, is a network camera (also called a mobile camera), which is used to capture a single image or continuous images and transmits the images to a receiving end via a network signal (such as a wired or wireless network signal), allowing the images to be displayed on at least one monitor. The term "selected operating environment" refers to an environment with a selected single light source or multiple light sources, and subsequently, the image capturing device will operate in the same or similar environment as the selected operating environment. The light sources in the "selected operating environment" can include standard light sources and/or non-standard light sources. In one embodiment, the light source in the "selected operating environment" is non-standard light source. In another embodiment, the light source in the "selected operating environment" differs from the light source used for image correction during the manufacturing of the image capturing device.

Next, referring to both FIG. 1 and FIG. 2, perform (3) step 106, using a system of the image capturing device to capture the RGB values of each of the color blocks of the color card 200 and converting the RGB values into the HSV value. According to an embodiment of the present disclosure, the system of the image capturing device includes a hardware (such as image sensors and memory modules) and a software (such as digital signal processing software), and the software of the image capturing device can operate remotely (also called cloud operation) without limiting the physical location of the hardware of the image capturing device. The image sensor in the image capturing device can be arranged in an array and can capture optical images of each of the color blocks and convert them into digital images. The digital image of each of the color blocks can be processed via the digital signal processing software in the image capturing device to obtain the RGB values of each block (i.e., R value, G value, B value) and further convert them into the HSV values (i.e., H value, S value, V value).

Since the color card 200 is placed in the selected operating environment, and this selected operating environment may have non-standard light sources, the RGB values captured from each of the color blocks and the resulting HSV value at this time may differ from the predefined color standard of each of the color blocks.

According to an embodiment of the present disclosure, during step 106, when capturing the RGB values of each of the color blocks on the color card 200, the system of the image capturing device will not capture images of other objects. For example, the system of the image capturing device will not capture some regions of portraits or human body (such as teeth, tongue, nose, etc.) but only capture image of each of the color blocks on the color card 200.

According to an embodiment of the present disclosure, during step 106, when capturing the RGB values of each of the color blocks on the color card 200, the RGB values of each of the color blocks will be captured simultaneously. In other words, the system of the image capturing device does not capture the RGB values of each of the color blocks sequentially, but rather simultaneously. This allows the RGB values of all the color blocks to correspond to a single selected operating environment rather than multiple selected operating environments.

Next, perform (4) step 108, comparing the predefined color standard of each of the color blocks and the HSV values of each of the color blocks to determine the degree of difference in H value, S value, and V value between the predefined color standards and the HSV values of each of the color blocks. According to an embodiment of the present disclosure, the predefined color standard of each of the color blocks is built into the system of the image capturing device, and step 108 can be performed by processing the digital signal processing software in the image capturing device.

Next, perform (5) step 110, automatically adjusting the HSV values set by the image capturing device based on the predefined color standards and the degree of difference. According to an embodiment of the present disclosure, the digital signal processing software in the image capturing device can automatically adjust the HSV values set by the image capturing device based on the binary search method or the best parameter step adjustment method to obtain the adjusted HSV value. When using the binary search method for correction calculations, the adjusted HSV value can be obtained more quickly.

According to an embodiment of the present disclosure, the V value, H value, and S value can be automatically adjusted in sequence based on the predefined color standard of each of the color blocks and the degree of differences. In another embodiment, the H value, S value, and V value can be automatically adjusted sequentially based on the predefined color standard of each of the color blocks and the degree of differences, to further enhance the lightness correction effect.

According to an embodiment of the present disclosure, when adjusting the H value in Step 110, the correction calculation is based on the color blocks 212, 213, 221-224, 231, 234, 241, 244, 251-254, 262, and 263 in the first group 202 and the second group 204. In another embodiment, when adjusting the H value in Step 110, the correction calculation is based only on the color blocks in the first group 202 and the second group 204, and not on the color blocks 211, 214, 232, 233, 242, 243, 261, and 264 in the third group 206. The color blocks in the third group 206 are primarily used to adjust the image grayscale, and their predefined color standards (e.g., HSV values) are located at or near the center of the HSV color space. When the position of these blocks in the color space shifts slightly, the corresponding H values change significantly. Therefore, if the correction calculation during the adjustment of the H value in Step 110 is simultaneously based on the color blocks from the first group 202, the second group 204, and the third group 206, it may lead to a large variance in the standard deviation of the H value of the adjusted image. In contrast, if the correction calculation is based only on the color blocks from the first group 202 and the second group 204, without taking into account the color blocks from the third group

206, it can result in a smaller variance in the standard deviation of the H value of the adjusted image.

According to an embodiment of the present disclosure, when adjusting the V value in Step 110, the adjustment is based on the color blocks in the third group 206. In one embodiment, when adjusting the V value in Step 110, the adjustment is based on the color blocks 211, 214, 232, 233, 242, 243, 261, and 264 in the third group 206, without taking into account the color blocks 212, 213, 221-224, 231, 234, 241, 244, 251-254, 262, and 263 in the first group 202 and the second group 204, so that a better lightness correction effects can be achieved.

Subsequently, the images captured by the image capturing device can be adjusted based on the adjusted HSV values, making the adjusted images closer to what is observed by the naked eye.

Figure 3:
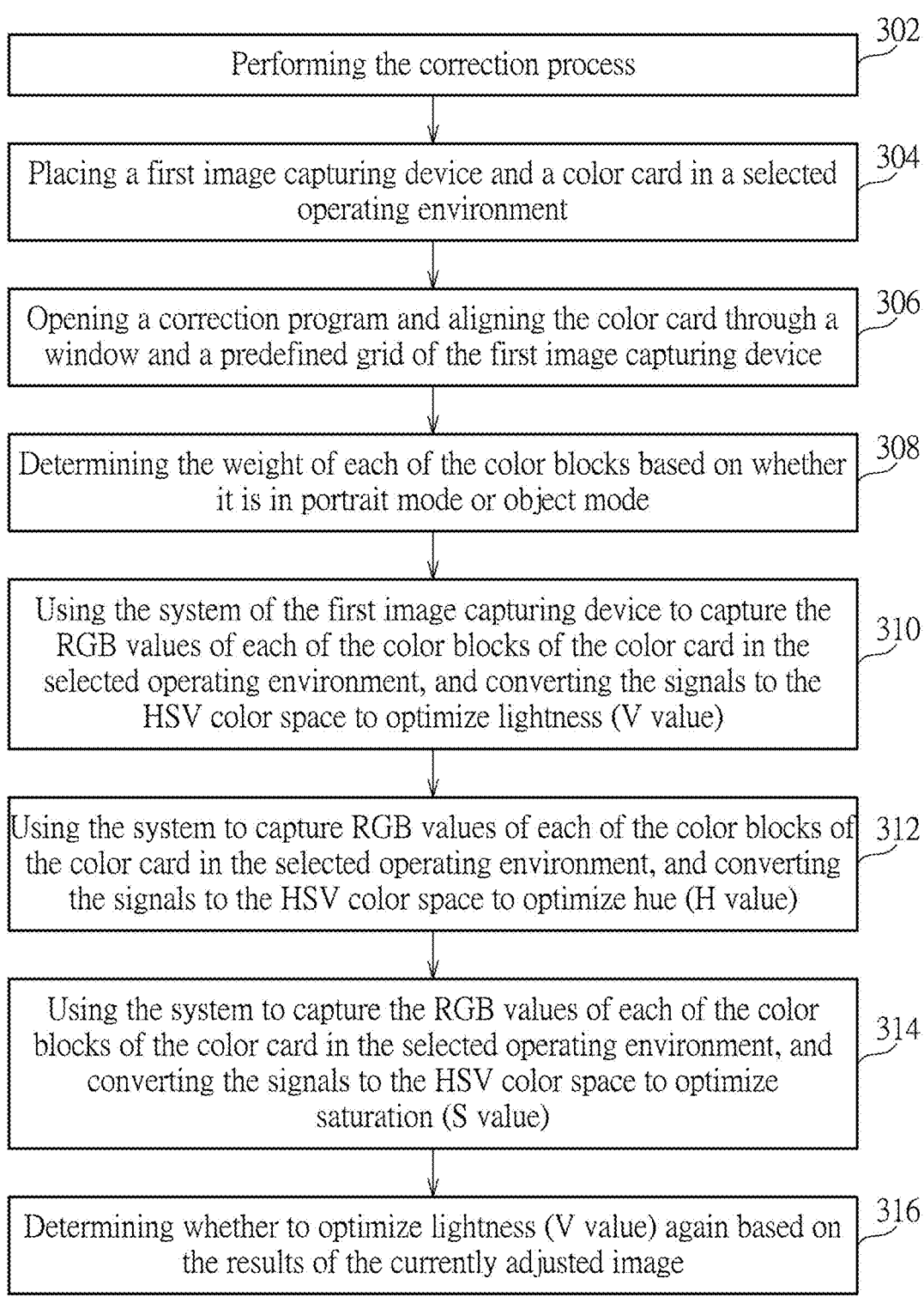
FIG. 3 is a flowchart of an image correction method according to another embodiment of the present disclosure.

FIG. 3 is a flowchart of the image correction method of another embodiment of the present disclosure. According to the flowchart shown in FIG. 3, an image correction method is provided, which includes at least the following steps: (1) Step 302, performing the correction process; (2) Step 304, placing a first image capturing device and a color card in a selected operating environment; (3) Step 306, opening a correction program and aligning the color card through a window and a predefined grid of the first image capturing device; (4) Step 308, determining the weight of each of the color blocks based on whether it is in portrait mode or object mode; (5) Step 310, using the system of the first image capturing device to capture the RGB values of each of the color blocks of the color card in the selected operating environment, and converting the signals to the HSV color space to optimize lightness (V value); (6) Step 312, using the system to capture RGB values of each of the color blocks of the color card in the selected operating environment, and converting the signals to the HSV color space to optimize hue (H value); (7) Step 314, using the system to capture the RGB values of each of the color blocks of the color card in the selected operating environment, and converting the signals to the HSV color space to optimize saturation (S value); (8) Step 316, determining whether to optimize lightness (V value) again based on the results of the currently adjusted image.

In Step 304, the first image capturing device, for example, is a camera.

In Step 306, the display window of the camera shows 24 enclosed geometric shapes that are separate from one another, and these geometric shapes are shown in a default pane. The user needs to adjust the alignment direction and angle of the camera so that each of the 24 geometric shapes is located within the corresponding 24 color blocks of the color card shown in the display window. In the subsequent process, the camera will capture the images of the color blocks corresponding to each geometric shape.

In Step 308, when the image capturing device shoots in a portrait mode, the weight of the second group 204, which is used for adjusting the colors in the portrait mode, will be increased by 2 to 6 times to make skin colors closer to their true colors.

In Step 310, it is necessary to compare the degree of difference between the predefined color standard and the V value to optimize lightness (V value).

In Step 312, it is necessary to compare the degree of difference between the predefined color standard and the H value to optimize the hue (H value).

In Step 314, it is required to compare the degree of difference between the predefined color standard and the S value to optimize the saturation (S value).

In another embodiment, steps 302-308 are performed first. Subsequently, in addition to adjusting lightness, hue, and saturation, parameters such as contrast, sharpness, gain, gamma, exposure, or 2D Lookup Table can be used to adjust the UVC parameters set by the first image capturing device.

In one embodiment, after performing steps 302-308, the HSV values set by the first image capturing device are adjusted to user-defined HSV values. This allows users to perform image correction according to their individual needs. In another embodiment, the HSV values obtained from each of the color blocks captured by the first image capturing device may be used as target value (first phase), and the target values are used to correct the HSV values set by other image capturing devices (for example, a second image capturing device) (second phase). In the first phase, the first image capturing device is first placed with the color card in the selected operating environment. Then, the correction program is opened while the window of the first image capturing device and the predefined grid are aligned with the color card. Next, the system of the first image capturing device captures the RGB values of each of the color blocks in the selected operating environment and converts the signals to the HSV color space. The correction process is subsequently performed for the second image capturing device. In the second phase, the second image capturing device is first placed in the selected operating environment. Then, the weight of each of the color blocks is determined based on whether it is in portrait mode or object mode. Using the system of the second image capturing device, the HSV values of the color blocks in the selected operating environment captured by the first image capturing device are obtained to optimize lightness (V value), hue (H value), and saturation (S value). Based on the results presented by the currently adjusted image, whether to optimize lightness (V value) again is determined.

FIG. 4 is a table of experimental data after image correction in one embodiment of the present disclosure. As shown in FIG. 4, the flowchart above can be used to correct the pre-correction image by using the target image as the expected goal. After automatically adjusting the V value, H value, S value, and V value in sequence, the H difference (dH), S difference (ds), and V difference (dV) of the image were reduced from the original values of 10.77, 7.31, and 19.48 to 5.17, 2.63, and 3.64, respectively, while the color difference values calculated using the dE2000 formula decreased from 14.81 to 4.00. The experimental results shown in FIG. 4 confirm that performing the described embodiments of the present disclosure indeed reduces the degree of color distortion in images.

Figure 5:
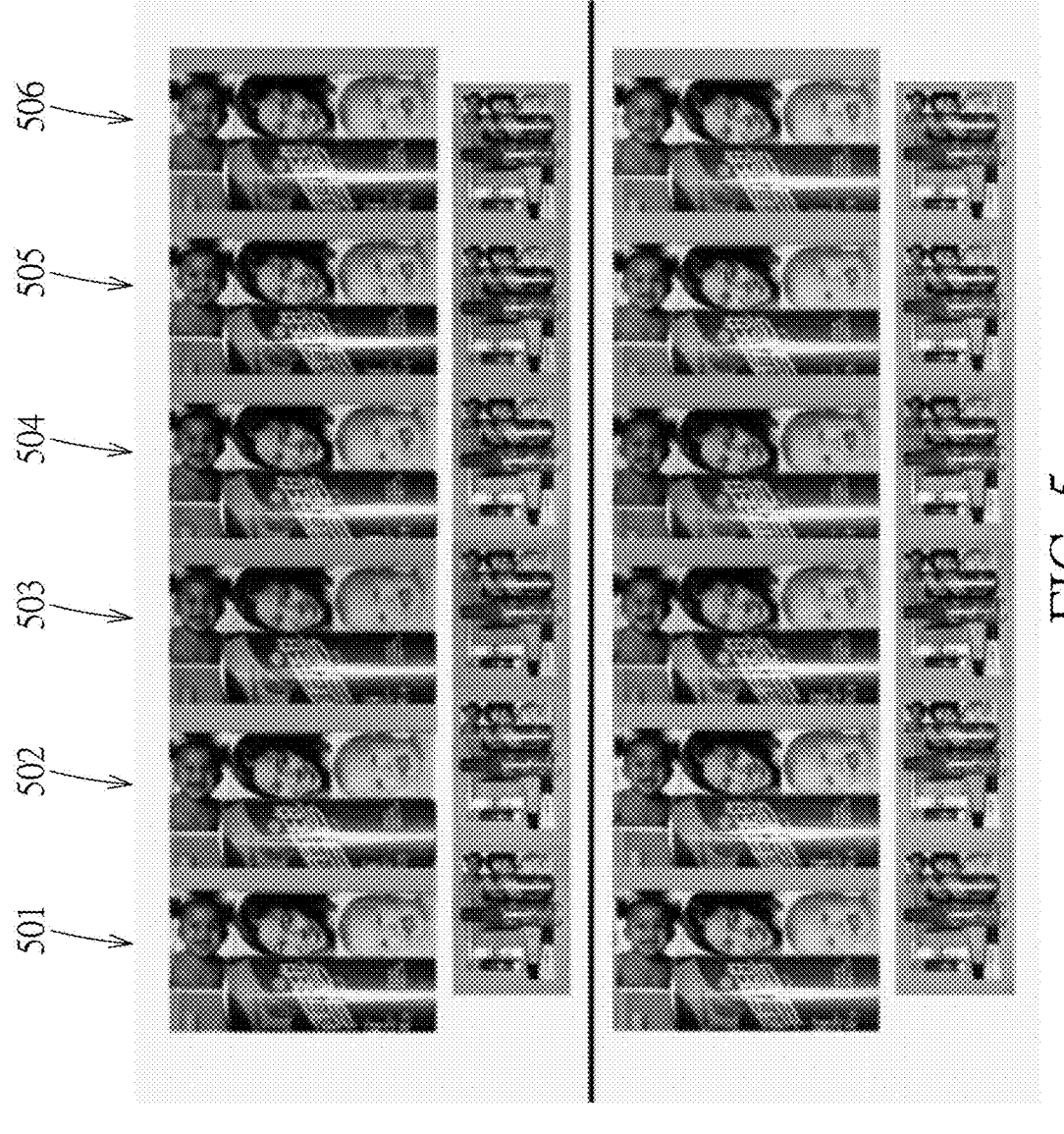
FIG. 5 is a result image after image correction according to one embodiment of the present disclosure.

FIG. 5 is a result image after image correction in one embodiment of the present disclosure. As shown in FIG. 5, images were captured under six environmental conditions 501-506 and then corrected to obtain the corrected images, which were later evaluated visually. Visual inspection revealed that the degree of color distortion in each corrected image was lower than the degree of color distortion of the original images. The environmental conditions 501-506 correspond to light sources of LED 4200K, CFL (Compact Fluorescent Lamp) 6500K, CFL 2700K, CFL 5400K, LED 3000K, and LED 5500K, respectively. It is clear that the image correction method of the present disclosure effectively reduces the distortion effects caused by environmental light sources, resulting in a better restoration of the true colors of objects under multiple or complex lighting conditions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image correction method, comprising:
   (1) obtaining a color card comprising a plurality of color blocks, wherein each of the color blocks is of a predefined color standard;
   (2) placing an image capturing device and the color card in a selected operating environment;
   (3) using a system of the image capturing device to capture RGB values of each of the color blocks on the color card and converting the RGB values into HSV values;
   (4) comparing the predefined color standard of each of the color blocks with the HSV values of each of the color blocks to determine a degree of difference in H value, S value and V value between the predefined color standards and the HSV values, wherein the H value represents hue, the S value represents saturation, and the V value represents lightness; and
   (5) automatically adjusting the HSV values set by the image capturing device according to the predefined color standards and the degree of difference of each of the color blocks;
   wherein the color blocks comprise a second group for adjusting in a portrait mode, and the second group comprises a color block of a first skin color, a color block of a second skin color, and a color block of a third skin color.

2. The image correction method according to claim 1, wherein the color blocks further comprise a first group for adjusting hue and saturation of an image, and the saturation of each of the color blocks in the first group is from 45% to 70%.

3. The image correction method according to claim 1, wherein the color blocks further comprise a first group for adjusting hue and saturation of an image, and a lightness of each of the color blocks in the first group is from 50% to 100%.

4. The image correction method according to claim 1, wherein an L value is between 50-70, an a value is between 7-12, and a b value is between 10-26 for the first skin color, wherein the L value represents lightness value, the a value represents green/red value, and the b value represents blue/yellow value.

5. The image correction method according to claim 1, wherein an L value is between 50-70, an a value is between 6-11, and a b value is between 7-19 for the second skin color, wherein the L value represents lightness value, the a value represents green/red value, and the b value represents blue/yellow value.

6. The image correction method according to claim 1, wherein an L value is between 40-60, an a value is between 7-16, and a b value is between 9-38 for the third skin color, wherein the L value represents lightness value, the a value represents green/red value, and the b value represents blue/yellow value.

7. The image correction method according to claim 1, wherein the color blocks further comprise a third group for adjusting grayscale of an image, and the grayscale value of each of the color blocks in the third group is between 32-235.

8. The image correction method according to claim 1, wherein the predefined color standard corresponds to the RGB values, the HSV values or Lab values exhibited by color cards under a standard light source environment.

9. The image correction method according to claim 1, wherein, in step (3) of capturing the RGB value of each of the color blocks on the color card, the system of the image capturing device does not capture images of other objects.

10. The image correction method according to claim 1, wherein, in step (3) of capturing the RGB value of each of the color blocks on the color card, the RGB values of the color blocks are captured simultaneously.

11. The image correction method according to claim 1, wherein, in step (5) of automatically adjusting the HSV values set by the image capturing device, the adjustment is based on a binary search algorithm or a best parameter step adjustment method.

12. The image correction method according to claim 1, wherein the color blocks comprise a first group for adjusting hue and saturation of an image, the second group for adjusting in a portrait mode, and a third group for adjusting a grayscale of an image,
   in step (5) of adjusting the H value, adjusting the H value in the HSV values set by the image capturing device according to the predefined color standard and the degree of difference of the color blocks in the first group and the second group.

13. The image correction method according to claim 1, wherein the color blocks comprise a first group for adjusting hue and saturation of an image, the second group for adjusting in a portrait mode, and a third group for adjusting a grayscale of an image,
   in step (5) of adjusting the V value, adjusting the V value in the HSV values set by the image capturing device according to the predefined color standard and the degree of difference of the color blocks in the third group.

14. The image correction method according to claim 1, wherein, in step (5) of automatically adjusting the HSV values set by the image capturing device, step (5) comprises automatically adjusting the V value, the H value, and the S value sequentially.

15. The image correction method according to claim 14, wherein after step (5) of automatically adjusting the HSV values set by the image capturing device, further comprising: automatically adjusting the V value according to the predefined color standard and the degree of difference of each of the color blocks.

16. The image correction method according to claim 1, before step (3) of using the system of the image capturing device to capture the RGB values of each of the color blocks on the color card, further comprising: adjusting a weight of the second group of the color blocks based on whether the image capturing device is in a portrait mode or an object mode.

17. The image correction method according to claim 1, wherein the selected operating environment refers to an environment with a single light source or multiple light sources.

18. The image correction method according to claim 17, wherein the selected operating environment refers to an environment different from light source(s) used for image correction during manufacturing of the image capturing device.

19. The image correction method according to claim 17, wherein a source of an image captured by the image capturing device is from indoor scenes.

20. The image correction method according to claim 1, wherein, when the image capturing device shoots in the portrait mode, a weight of the second group is increased by 2 to 6 times.

* * * * *